(12) United States Patent
Harada et al.

(10) Patent No.: US 7,052,800 B2
(45) Date of Patent: May 30, 2006

(54) SEPARATOR FOR NICKEL-METAL HYDRIDE STORAGE BATTERY AND NICKEL-METAL HYDRIDE STORAGE BATTERY

(75) Inventors: Yasuyuki Harada, Naruto (JP); Tadayoshi Tanaka, Takatsuki (JP); Yoshifumi Magari, Kobe (JP); Katsuhiko Shinyama, Kobe (JP); Toshiyuki Nohma, Kobe (JP); Ikuo Yonezu, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/228,943

(22) Filed: Aug. 28, 2002

(65) Prior Publication Data

US 2003/0048094 A1    Mar. 13, 2003

(30) Foreign Application Priority Data

Aug. 29, 2001 (JP) .............................. 2001-258897

(51) Int. Cl.
*H01M 2/16* (2006.01)
*H01M 6/04* (2006.01)

(52) U.S. Cl. .................. 429/145; 144/218.2; 144/248; 144/249

(58) Field of Classification Search ............... 429/142, 429/144, 145, 206, 218.2, 248, 749, 44

See application file for complete search history.

(56) References Cited

U.S. PATENT DOCUMENTS

| 4,359,510 A | * | 11/1982 | Taskier ................. 429/144 |
| 5,401,594 A | * | 3/1995 | Schwobel et al. ........ 429/142 |
| 5,798,189 A | * | 8/1998 | Hayashida et al. ....... 429/101 |
| 5,955,216 A | * | 9/1999 | Hoshina et al. .......... 429/144 |
| 6,235,430 B1 | * | 5/2001 | Hoshina et al. .......... 429/250 |
| 6,537,696 B1 | * | 3/2003 | Whear et al. ............ 429/144 |
| 6,607,859 B1 | * | 8/2003 | Tanaka et al. ........... 429/145 |
| 2002/0160259 A1 | * | 10/2002 | Kinn et al. ............. 429/144 |

FOREIGN PATENT DOCUMENTS

| CN | 1294608 A |   | 5/2001 |
| JP | 62-115657 A |   | 5/1987 |
| JP | 04-286863 A |   | 10/1992 |
| JP | 06-076807 A |   | 3/1994 |
| JP | 08-227707 A |   | 9/1996 |
| JP | 08227707 A | * | 9/1996 |
| JP | 09-330692 A | * | 12/1997 |

OTHER PUBLICATIONS

Linden. Handbook of Batteries, 2nd ed., p. 33.1., 1995 (no month).*
Clariant Report, Exactly your Chemistry, How intelligent are textiles?, pp. 34-37, Feb. 2000.*
U.S. Appl. No. 60/270,483 filed on Feb. 21, 2001.*

* cited by examiner

*Primary Examiner*—Tracy Dove
(74) *Attorney, Agent, or Firm*—Kubovcik & Kubovcik

(57) ABSTRACT

A separator for a nickel-metal hydride storage battery having a hydrogen-absorbing alloy as a negative electrode. The separator is a laminate of a substrate and a porous hydrophilic film.

7 Claims, 2 Drawing Sheets

# SEPARATOR FOR NICKEL-METAL HYDRIDE STORAGE BATTERY AND NICKEL-METAL HYDRIDE STORAGE BATTERY

FIELD OF THE INVENTION

The present invention relates to a nickel-metal hydride storage battery and a separator for a nickel-metal hydride storage battery including a hydrogen-absorbing alloy. The invention is characterized as an improved separator for a nickel-metal hydride storage battery which inhibits self-discharge in a nickel-metal hydride storage battery and inhibits a decrease of the capacity of the battery caused by a short circuit between a positive electrode and a negative electrode.

BACKGROUND OF THE INVENTION

A nickel-metal hydride storage battery, a nickel cadmium storage battery, a nickel zinc storage battery, and the like have been conventionally used as alkaline storage batteries. A nickel-metal hydride storage battery that has high capacity and is excellent in environmental safety has recently become widely used as a power source for an electric vehicle, a hybrid vehicle, an electric motorcycle, electric tools, and the like.

In such nickel-metal hydride storage batteries, an alkaline electrolyte is employed and a separator is provided between a positive electrode which includes nickel hydroxide and a negative electrode which includes a hydrogen-absorbing alloy.

As the separator, a woven or nonwoven fabric comprising polyamide and polyolefin, or a porous film of a fluorine plastic film is generally used.

In the above described nickel-metal hydride storage battery, a nitrogen-containing ion, for example, ammonium ion, nitrate ion, or the like, is included as an impurity in a positive electrode, etc. The nitrogen-containing ion causes self-discharge in the nickel-metal hydride storage battery and inferior storage characteristics of the battery.

A separator which is an acrylic monomer graft-polymerized onto a polyolefin material has been recently proposed to solve such problem. A carboxyl group included in the separator traps a nitrogen-containing ion impurity. A separator in which a sulfo group has been introduced into a polyolefin material by treatment of the polyolefin material with concentrated sulfuric acid or fuming sulfuric acid has also been proposed. In the separator, a sulfo group traps nitrogen-containing ions.

However, a separator material made of an acrylic monomer graft-polymerized onto a polyolefin generally has poor heat resistance and acid resistance. Therefore, it is difficult to use it for an extended period and the life of the nickel-metal hydride storage battery is shortened.

The separator in which a sulfo group is introduced into a polyolefin material by treatment of the polyolefin material with concentrated sulfuric acid or fuming sulfuric acid has a problem in that the separator is deteriorated by the treatment with a concentrated sulfuric acid or fuming sulfuric acid and likely causes a short circuit between positive and negative electrodes.

Recently, studies have been carried out to make a separator thin to increase capacity and power output of a nickel-metal hydride storage battery.

However, a hydrogen-absorbing alloy used for a negative electrode is pulverized and separates from the negative electrode after repeated charging and discharging of a nickel-metal hydride storage battery. When the separator is made thinner, fine powder of the hydrogen-absorbing alloy passes through the separator, and causes a short circuit to reduce the capacity of the battery. Especially, when the battery is used as a power source for an electric vehicle, a hybrid vehicle or an electric motorcycle, an amount of fine powder of the hydrogen-absorbing alloy which separates from the negative electrode increases due to vibrations, and a short circuit is more likely to occur to reduce a capacity of the battery.

Therefore, a separator which includes a laminate of a woven or a nonwoven alkaline resistant fabric and a fine porous fluorine plastic film is disclosed in Japanese Patent Laid-open Publication No. 9-330692.

However, the separator described above does not have a sufficient hydrophilic nature because of the use of the fluorine plastic film. Charge and discharge characteristics of the battery are diminished and cost of the battery is also high.

OBJECT OF THE INVENTION

An object of the present invention is to provide improvements in a nickel-metal hydride storage battery having a negative electrode including an hydrogen-absorbing alloy. These are inhibition of self-discharge of the nickel-metal hydride storage battery caused by a nitrogen-containing ion impurity, and control of reduction of charge-discharge characteristics of the nickel-metal hydride storage battery due to a decrease in the hydrophilic nature of the separator.

SUMMARY OF THE INVENTION

The present invention provides a separator for a nickel-metal hydride storage battery having a hydrogen-absorbing alloy as a negative electrode and comprising a laminate of a sulfonated substrate and a porous hydrophilic film for solving the above problems.

[Explanation of Elements]
1a: substrate
1b: porous film
2: positive electrode
3: negative electrode

DETAILED EXPLANATION OF THE INVENTION

When the separator for a nickel-metal hydride storage battery comprising a laminate of a sulfonated substrate and a hydrophilic porous film is placed between a positive electrode and a negative electrode of a nickel-metal hydride storage battery, a sulfo group contained in the sulfonated substrate traps a nitrogen-containing ion impurity included in the nickel-metal hydride storage battery, and as a result, self discharge of the battery caused by the nitrogen-containing ion impurity can be inhibited. The hydrophilic porous film strengthens the separator and inhibits a fine powder of the hydrogen-absorbing alloy which has separated from the negative electrode from passing through the separator to prevent a short circuit from reducing the capacity of the battery. Furthermore, reduction of a hydrophilic nature of the entire separator is also prevented.

As the substrate to be sulfonated, a woven fabric or nonwoven fabric comprising a polyolefin which is generally inexpensive and chemically stable is preferred.

The above-described substrate is treated with concentrated sulfuric acid or fuming sulfuric acid to sulfonate (introduce a sulfo group into) the substrate.

Regarding thickness of the substrate, it can be less than 150 μm because the porous film enhances the strength of the separator. The thickness is preferred to be within the range of 60~120 μm to obtain sufficient strength.

Regarding the hydrophilic porous film, it is preferable to select at least one material from polyolefins, polyamides and polyesters that are inexpensive. Polyolefin that is excellent in stability is more preferable. If a separator for a nickel-metal hydride storage battery includes a porous film comprising polyamide or polyester, the porous film is preferably located on the negative electrode side that comprises an hydrogen-absorbing alloy to prevent oxidizing.

If a diameter of pores of the porous film is large, a fine powder of the hydrogen-absorbing alloy created by charging and discharging of the battery will easily pass through the pores of the porous film. If a diameter of pores of the porous film is too small, resistance inside of the battery will be increased. Therefore, it is preferable to use a porous film having a diameter of the pores in a range of 1~50 μm. A range of 10~30 μm is more preferable. A powder of the hydrogen-absorbing alloy created by charging and discharging of the battery has a diameter of several to tens μm. Powder of the hydrogen-absorbing alloy having a large diameter blocks pores of the porous film and the powder of the hydrogen-absorbing alloy is inhibited from passing through the pores.

DESCRIPTION OF PREFERRED EMBODIMENTS

A separator for a nickel-metal hydride storage battery and a nickel-metal hydride storage battery of the present invention are described below in detail in conjunction with the drawings.

Figure 1:
FIG. 1 is a drawing showing an outline of a separator for a nickel-metal hydride storage battery used in an embodiment of the present invention.

In the embodiment as shown in FIG. 1, a laminated film of a sulfonated substrate 1a and a hydrophilic porous film 1b was used as a separator for a nickel-metal hydride storage battery.

Figure 2:
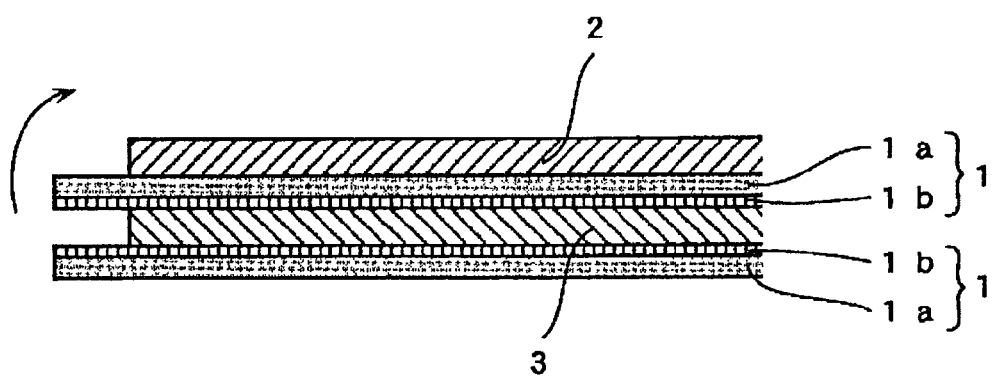
FIG. 2 is a drawing showing a process for preparing an electrode assembly having a separator for a nickel-metal hydride storage battery between a positive electrode and a negative electrode.

When the separator 1 for a nickel-metal hydride storage battery was placed between a positive electrode 2 containing nickel hydroxide and a negative electrode 3 made of an hydrogen-absorbing alloy, as shown in FIG. 2, two separators 1 for a nickel-metal hydride storage battery were used. One separator 1 was sandwiched between the positive electrode 2 and the negative electrode 3 so as to contact the hydrophilic porous film 1b of the separator 1 on the negative electrode 3 made from a hydrogen-absorbing alloy. Another separator 1 was placed on another side of the negative electrode with the hydrophilic porous film 1b contacting the negative electrode 3. Then it was rolled to prepare an electrode assembly 10.

Figure 3:
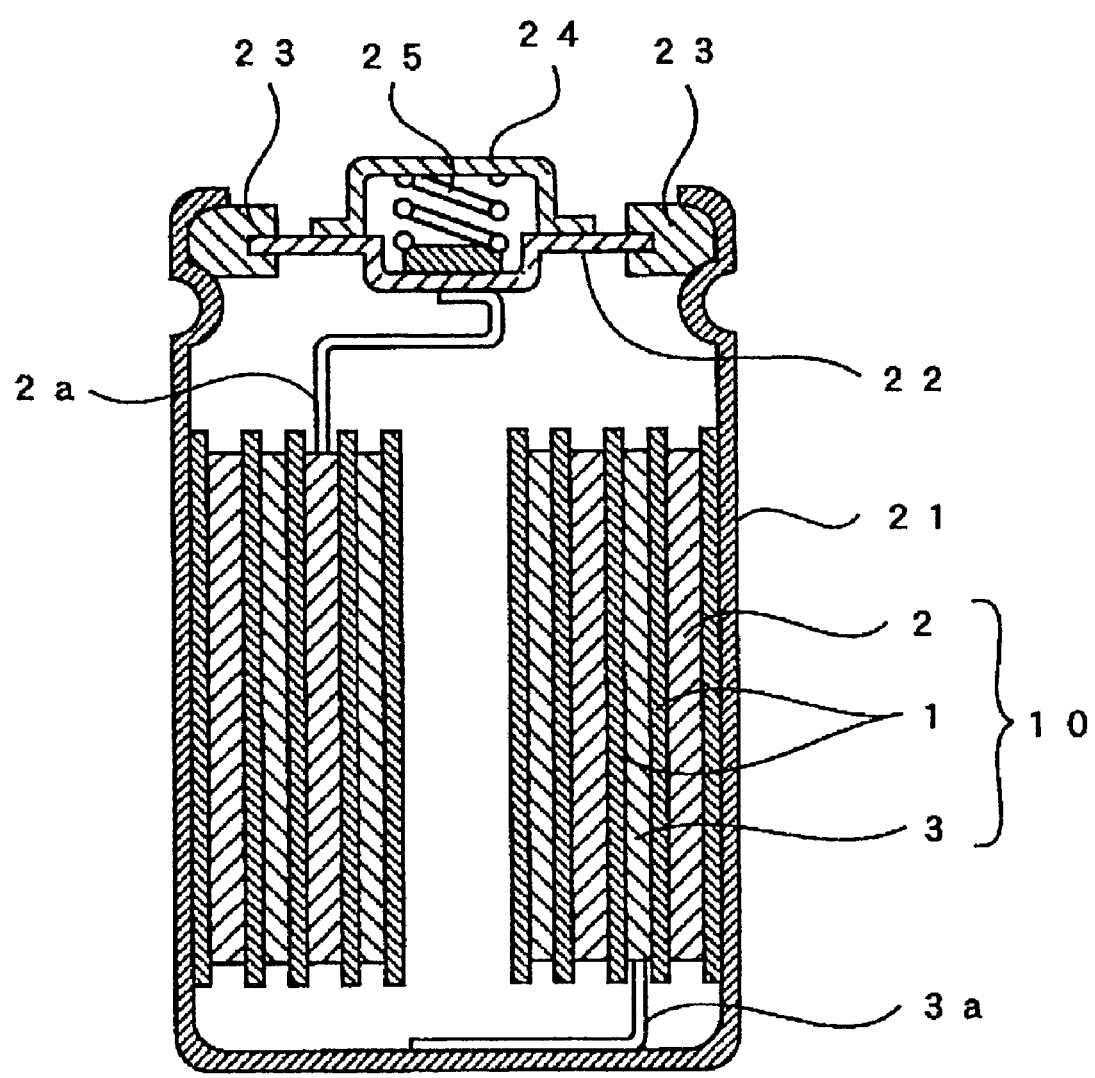
FIG. 3 is a cross section of an embodiment of a nickel-metal hydride storage battery of the present invention.

In this embodiment of the preparation of a nickel-metal hydride storage battery, as shown in FIG. 3, the electrode assembly 10 prepared above was housed in a negative electrode can 21, alkaline electrolyte was poured into the negative electrode can 21 and the opening was closed. Positive electrode 2 was connected to a sealing lid 22 through a positive electrode lead 2a and negative electrode 3 was connected to the negative electrode can 21 through a negative electrode lead 3a. The electrode can 21 and the sealing lid 22 were electrically insulated by an insulating packing 23. A coil spring 25 was placed between the sealing lid 22 and an external positive electrode terminal 24. The coil spring 25 is compressed and releases gas from inside of the battery to the atmosphere when pressure in the battery unusually increases.

In the nickel-metal hydride storage battery prepared as described above, a nitrogen-containing ion impurity is trapped by a sulfo group in the substrate 1a used for the separator 1 for the nickel-metal hydride storage battery, and self-discharge caused by the nitrogen-containing ion impurity is inhibited. The strength of the separator is enhanced by the porous film 1b. Fine powder of the hydrogen-absorbing alloy separated from the negative electrode 3 can be inhibited from passing through the holes of the separator to prevent reduction of the capacity of the battery by a short circuit.

In the above-described embodiment, the entire separator that separates the positive electrode 2 from the negative electrode 3 was comprised of the separator 1 for nickel-metal hydride storage battery. It is also possible to use a portion of the separator 1 for nickel-metal hydride storage battery, or to use the separator 1 as only one of two separators.

In the above described embodiment, even if the hydrophilic porous film 1b is made of a polyamide or polyester, the porous film 1b can be prevented from oxidizing because the hydrophilic porous film 1b in the separator 1 is placed in contact with the negative electrode 3 comprising the hydrogen-absorbing alloy. However, especially if the porous film 1b is made of polyolefin having excellent stability, it is not necessary for the hydrophilic porous film 1b of the separator 1 to be placed in contact with the negative electrode 3 comprising the hydrogen-absorbing alloy.

The following example and comparative examples show that a separator for a nickel-metal hydride storage battery comprising a laminate of a sulfonated substrate and a hydrophilic porous film can inhibit passing therethrough of fine powder of an hydrogen-absorbing alloy.

EXAMPLE 1

A separator made of a laminate of a nonwoven substrate comprising a copolymer of polypropylene and polyethylene and sulfonated by sulfuric acid, and having a basis weight of 53 g/m$^2$ and a thickness of 0.12 mm and a polyethylene porous film was used.

COMPARATIVE EXAMPLE 1

A separator made of a nonwoven substrate comprising a copolymer of polypropylene and polyethylene and sulfonated by a sulfuric acid, and having a basis weight of 53 g/m$^2$ and a thickness of 0.12 mm was used.

COMPARATIVE EXAMPLE 2

A separator made of a nonwoven substrate comprising a copolymer of polypropylene and polyethylene and sulfonated by a sulfuric acid, and having a basis weight of 60 g/m² and a thickness of 0.15 mm was used.

Each separator of Example 1 and Comparative Examples 1 and 2 was mounted on sieves of 100 mesh, and was covered by a tape except for an area of 2×2 cm.

20 g of an hydrogen-absorbing alloy powder having an average diameter of 20 μm was placed on the uncovered area of 2×2 cm. Then each separator was continuously vibrated at 3600 rpm at an amplitude of 2.5 mm for 10 minutes by a octagon digital sieve shaker (made by Endecott). The amount of the hydrogen-absorbing alloy powder falling through each separator was measured. The results are shown below in Table 1.

TABLE 1

|  | Example 1 | Comparative Example 1 | Comparative Example 2 |
|---|---|---|---|
| Falling Amount (g) | 0 | 3 | 2.5 |

The separator in Example 1 that was a laminate of layers of the sulfonated nonwoven substrate and the porous film did not pass the hydrogen-absorbing alloy powder. The hydrogen-absorbing alloy powder passed through the separators in Comparative Examples 1 and 2 comprised only of the sulfonated nonwoven substrate even with different basis weight and thickness.

Therefore, if a nickel-metal hydride storage battery having the separator in Example 1 is used as a power source for an electric vehicle, a hybrid vehicle and an electric motorcycle, and is vibrated, it prevents the hydrogen-absorbing powder from passing through the separator and also prevents a reduction of capacity of the battery by a short circuit.

ADVANTAGES OF THE INVENTION

As explained in detail, in the present invention, self discharge caused by a nitrogen-containing ion impurity included in a nickel-metal hydride storage battery can be inhibited because a sulfo group of a substrate that is a part of a separator comprising a laminate of a substrate and a hydrophilic porous film and that is placed between a positive electrode and a negative electrode traps the nitrogen-containing ion impurity.

A hydrophilic porous film laminated on the above-described substrate enhances the strength of the separator and prevents occurence of a short circuit that is caused when a fine powder of the hydrogen-absorbing alloy separates from the negative electrode and passes through the separator. Furthermore, the separator is prevented from reduction of its hydrophilic nature.

As a result, the present invention can provide a nickel-metal hydride storage battery having excellent charge and discharge characteristics and free from self discharge that causes reduction of storage characteristics and from reduction of capacity caused by a short circuit between positive and negative electrodes.

What is claimed is:

1. A nickel-metal hydride storage battery comprising a separator provided between a positive electrode and a negative electrode, wherein the negative electrode comprises a hydrogen absorbing alloy and the separator comprises a laminate of a sulfonated substrate and a polyamide porous film, a diameter of pores of said polyamide porous film being in a range of 1–50 μm.

2. The nickel-metal hydride storage battery according to claim 1, wherein said sulfonated substrate is a woven or nonwoven sulfonated polyolefin fabric.

3. The nickel-metal hydride storage battery according to claim 1, wherein the diameter of pores of said polyamide porous film being in a range of 10–30 μm.

4. The nickel-metal hydride storage battery according to claim 1, wherein a thickness of said sulfonated substrate is less than 150 μm.

5. The nickel-metal hydride storage battery according to claim 1, wherein a thickness of said sulfonated substrate is 60–120 μm.

6. The nickel-metal hydride storage battery according to claim 2, wherein a thickness of said sulfonated substrate is less than 150 μm.

7. The nickel-metal hydride storage battery according to claim 2, wherein a thickness of said sulfonated substrate is 60–120 μm.

* * * * *